Patented Feb. 19, 1952

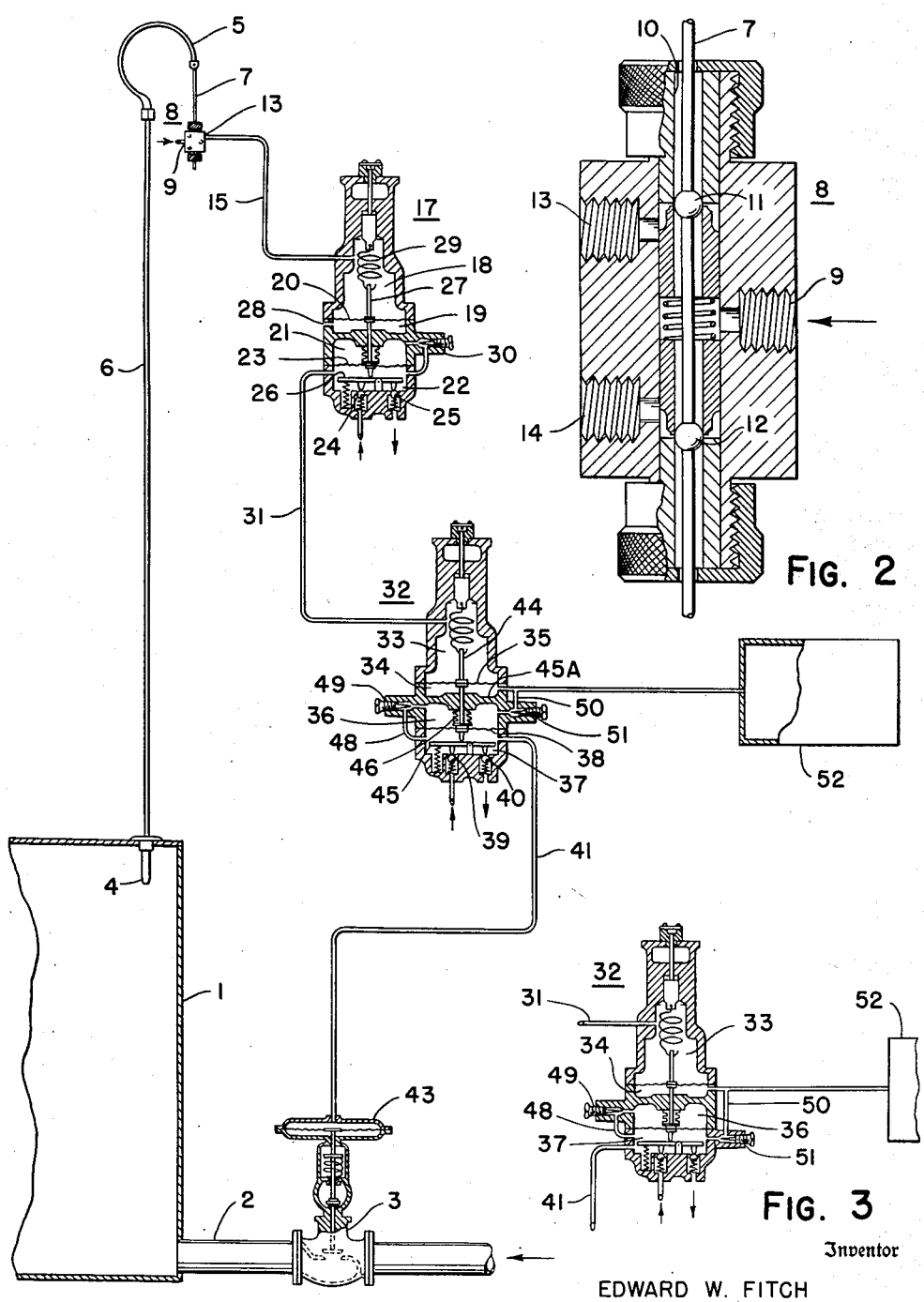

2,586,637

UNITED STATES PATENT OFFICE 2,586,637

FLUID PRESSURE RELAY

Edward W. Fitch, Poland, Ohio, assignor to Bailey Meter Company, a corporation of Delaware Original application July 14, 1941, Serial No. 402,386. Divided and this application April 13, 1948, Serial No. 20,796

4 Claims. (Cl. 137—153)

This invention relates to control systems for maintaining a condition such as pressure, temperature, level, electromotive force, or the like at or substantially at a desired value through regulating the rate of application of an agent producing, maintaining or otherwise affecting the condition.

In accordance with my invention the rate of application of the agent is varied in accordance with the second derivative of the magnitude of the condition with respect to time, or in other words in accordance with the rate of change of the rate of change in the magnitude of the condition. In order for control systems establishing a control effect varying in proportion to the magnitude of a condition with respect to time, or in accordance with the first derivative thereof to act, it is necessary that there be an appreciable change in the magnitude of the condition before the control effect will have changed sufficiently to produce a material effect on the rate of application of the agent. A consideration of the principles of my invention will indicate, however, that the control effect produced thereby changes most rapidly at the instant the condition is changing most rapidly, and accordingly acts to correct the rate of application of the agent before a material change in the magnitude of the condition has occurred. In other words, changes in the magnitude of the condition are anticipated, and proper correction in the rate of application of the agent made before such change has produced an appreciable departure in the magnitude of the condition from that desired. In order that the condition will be restored exactly to the desired magnitude after departure therefrom my invention further contemplates modifying the control of the agent in accordance with the second derivative of the magnitude of the condition by control responsive to the first derivative of the magnitude of the condition, which may in turn be modified by a control in response to the magnitude of the condition with respect to time.

I will describe my invention as applied to control systems wherein the control effect established by the condition responsive device is a variable fluid pressure.

In the drawings:

Fig. 1 is a diagrammatic illustration of an embodiment of my invention.

Fig. 2 is an elevation view in cross section of a preferred form of pilot valve.

Fig. 3 illustrates a modification of a part of the control system shown in Fig. 1.

Referring to Fig. 1, I therein show an energy utilizing device, such as a tank 1, which is maintained at a predetermined or desired temperature by an agent such as steam, for example, supplied through a conduit 2, in which is located a regulating valve 3. The temperature within the tank 1 is determined by means of a thermometric system comprising a bulb 4 connected to a Bourdon tube 5 by means of a capillary 6. The bulb 4, Bourdon tube 5, and capillary 6 are charged with an inert gas, liquid, or vapor, so that the pressure therein varies in consonance with variations in temperature within the tank 1. As the temperature within the tank 1 increases the free end of the Bourdon tube 5 is positioned in a counterclockwise direction, and as the temperature decreases in a clockwise direction. Through the agency of devices hereinafter to be described the valve 3 is positioned by a fluid pressure established by the Bourdon tube 5 to vary the rate of flow of steam to maintain the temperature within the tank 1 at the desired value. The thermometric system comprising the bulb 4, capillary 6 and Bourdon tube 5 has been illustrated merely by way of example, it being evident that any suitable condition responsive device, such as a resistance thermometer, potentiometer pyrometer, rate of flow meter, etc. may be substituted, depending upon the particular condition and value of the condition to be controlled.

Positioned by the free end of the Bourdon tube 5 is a movable valve stem 7 of a pilot valve 8 illustrated as being of the type forming the subject matter of United States patent to Clarence Johnson dated September 15, 1936, No. 2,054,464. The pilot valve 8 is shown in cross section and to larger size in Fig. 2. A fluid under pressure, such as compressed air, is admitted to the pilot valve 8 through an inlet port 9, which is connected to a passageway 10 running longitudinally through the body of the pilot valve and open at either end to the atmosphere. A flow of pressure fluid is maintained from the inlet port 9 through the passageway 10 and exhausted to the atmosphere.

The movable valve member 7 carries lands 11 and 12 which are of slightly less diameter than the passageway 10, so that a pressure gradient is established by the pressure fluid in flowing past them. Immediately adjacent the land 11 is an outlet port 13, and adjacent the land 12 is a similar outlet port 14. The positions of the lands 11 and 12 relative to the outlet ports 13 and 14 determine the pressure established thereat. As the movable valve member 7 is moved upwardly, the pressure at the outlet port 13 increases, whereas that at the outlet port 14 decreases. Conversely when the valve member 7 is moved downwardly the pressure established at the outlet port 13 decreases, whereas that established at the outlet port 14 increases.

In the embodiment of my invention disclosed in Fig. 4, I prefer to establish a fluid pressure varying directly with the magnitude of the temperature within the tank 1. Accordingly, I connect a pipe 15 to the outlet port 13 of the pilot 8. As the Bourdon tube 5 is positioned in a counterclockwise direction, proportional to increases in temperature within the tank 1, the pressure within the pipe 15 will likewise increase proportionally. In other words, for every temperature existing within the tank 1 there will be a predetermined definite pressure established within the pipe 15. Pressure fluid may be prevented from exhausting through the outlet port 14 by inserting therein a suitable plug or stopper.

The pipe 15 serves to transmit pressures established by the pilot valve 8 to a standardizing relay 17 shown as being of the type forming the subject matter of United States patent to Harvard H. Gorrie, Reissue Patent No. 21,804. The relay 17 comprises a pair of chambers 18 and 19 separated by a pressure sensitive diaphragm 20 and a similar pair of chambers 21 and 22 separated by a pressure sensitive diaphragm 23. Fluid under pressure from any suitable source (not shown) is admitted to the chamber 22 through an inlet or supply valve 24 and exhausted therefrom through an exhaust or waste valve 25. Tilting of a fulcrum beam 26 in one direction opens the valve 24, and tilting in the opposite direction opens the valve 25. The beam 26 is actuated by a movable member 27 operatively connecting diaphragms 20 and 23. Downward movement of the member 27 from the neutral position shown serves to open the valve 24, thereby admitting pressure fluid to the chamber 22. Conversely, upward movement of the member 27 serves to open the valve 25, exhausting pressure fluid from the chamber 22.

The effective force acting on the diaphragm 20 is proportional to the difference in pressures within chambers 18 and 19. As shown, the pressure established by the pilot 8 is admitted to chamber 18, whereas chamber 19 is opened to the atmosphere through a port 28, so that the pressure therein remains substantially constant. The effective force acting upon the diaphragm 23 is proportional to the difference in pressures within chambers 21 and 22.

The relay 17 is adjusted by means of a spring 29 so that with equal pressures existing within chambers 21 and 22 and the pressure established by the pilot 8 at a value corresponding to the desired value of the temperature within the tank 1, valves 24 and 25 are closed. Upon an increase in temperature above the desired value the pressure within chamber 18 will increase proportionately, and inlet valve 24 will open until the pressure within chamber 22 has increased a proportionate amount, or until the force acting upwardly on the diaphragm 23 again balances the force acting downwardly on the diaphragm 20, when equilibrium will be restored.

Chambers 21 and 22 are shown in communication through an adjustable bleed valve 30. When the pressure within chamber 22 is increased to restore equilibrium, pressure fluid will slowly seep through the valve 30, increasing the pressure within chamber 21. As the pressure within chamber 21 increases the upwardly acting force on the diaphragm 23 will decrease, causing valve 24 to again open and increase the pressure within chamber 22 still further. Such regenerative action will continue so long as the temperature within the tank 1 remains above the desired value, the fluid pressure within the chamber 22 gradually increasing at a rate dependent upon the extent of departure of the temperature from the desired value. As the temperature returns toward the desired value, the pressure within chamber 22 is decreased proportionately, and when the temperature is again at the desired value the pressure within the chamber 22 will be equal to that in chamber 21, although at a different magnitude than existed previous to the original departure of the temperature from the desired value.

Upon a decrease in temperature below the desired value the reverse action occurs. The fluid pressure within chamber 22 is first reduced an amount proportional to the decrease in temperature, and thereafter due to the differential thus established between chambers 21 and 22 is continuously reduced at a rate proportional to the decrease in temperature until the desired value of temperature is again restored.

Pressures within the chamber 22 are transmitted through a pipe 31 to a directional or accelerating relay 32, in some physical aspects similar to the relay 17, but as will now be explained in detail so arranged that it superimposes upon the loading pressure established by the relay 17 a temporary loading pressure corresponding or proportional in magnitude to the rate at which the temperature within the tank 1 is changing. Thus, notwithstanding that the temperature within the tank 1 be but one degree F. from that desired, if at that instant the temperature is changing at a relatively rapid rate the relay 32 will act to superimpose upon the loading pressure established by the relay 17 a loading pressure of relatively great magnitude, whereas even though the temperature within the tank 1 may be five degrees F. from that desired if no change is taking place in the temperature at that instant the relay 32 will merely act to transmit directly the loading pressure established by the relay 17.

The relay 32 comprises a first pair of chambers 33 and 34 separated by a pressure sensitive diaphragm or wall 35 and a second pair of chambers 36 and 37 separated by a second pressure sensitive diaphragm or wall 38. The chamber 37 is provided with a supply valve 39 and an exhaust valve 40. Pressures established within the chamber 37 are transmitted as a control pressure through a pipe 41 to the diaphragm motor 43 of the valve 3.

The pressure sensitive diaphragms within the relay 32 are connected by a movable member 44, which operates a fulcrumed lever 45 to cause the valves 39 and 40 to open and close. As shown, when the member 44 is in the neutral position neither the valve 39 or 40 is open, or both may be opened the same amount so that the pressure within the chamber 37 remains constant. Upon the member 44 moving downwardly the valve 39 will open, thereby causing the pressure within the chamber 37 to increase. Conversely, when the movable member 44 moves upwardly from the position shown, the valve 40 will open, thereby causing the pressure within the chamber 37 to decrease.

Chambers 34 and 36 are separated by a partition 45A through which the movable member 44 passes by means of a flexible bellows 46. By virtue of this arrangement the only force acting upon the member 44 and tending to cause it to move in one direction or the other from the neutral position is the net difference in forces created by the difference in pressures within the chambers 33, 34 and 36, 37. Thus assuming that the member 44 is in the neutral position, if a change in pressure occurs within the chamber 33, then the member 44 will be moved upwardly or downwardly, causing the pressure within the chamber 37 to change, and causing a corresponding movement of the control valve 3. Likewise a change of pressure within the chamber 34, 36 or 37 will cause a movement of the member 44. If by virtue of changes in pressure in other chambers of the relay the forces acting upon the member 44 are again neutralized, the latter will be restored to the neutral position and the pressure within the chamber 37 thereafter remain constant until there is a further unbalance of forces.

The chamber 37 is shown as being connected to the chamber 36 through a pipe 48 in which is disposed an adjustable bleed valve 49. Likewise the chamber 36 is shown as being connected to the chamber 34 through a pipe 50 in which is disposed an adjustable bleed valve 51. For purposes hereinafter more fully discussed the chamber 34 is also connected to a volume chamber diagrammatically illustrated at 52.

The bleed valves 49 and 51 are adjustable so that any relative rates of bleed may be obtained between the various chambers. Usually I prefer that the bleed valve 49 be adjusted for a relatively fast bleed, whereas the valve 51 be adjusted for a relatively slow bleed. Assume, however, for purposes of illustration and as an aid in understanding the invention, that the bleed valves 49 and 51 are adjusted to permit unrestricted flow between the chambers 37, 36 and 34. Under such conditions the pressure within the chamber 34 will alway counteract or balance that within the chamber 36, so that no force will be produced acting either to position the member 44 upwardly or downwardly. Therefore the pressure within the chamber 33, in order for the member 44 to be in the neutral position, must be balanced by that existing within the chamber 37. It will be observed that with this adjustment of bleed valves 49 and 51 the relay 32 will operate to vary the pressure within the chamber 37 so that the member 44 is substantially instantaneously restored to the neutral position after departure therefrom and also that the pressure within chamber 37 is maintained equal to that in chamber 33. For example, upon an increase in pressure within the chamber 33, causing the member 44 to move downwardly, the inlet valve 39 will open, thereby permitting the pressure within the chamber 37 to increase. Such increase in pressure, producing a force acting upon the member 44 in the opposite direction to the force produced by the pressure within the chamber 33, will restore the member 44 to the neutral position when the increase in pressure within the chamber 37 is equal to the increase in pressure within the chamber 33, the pressures within chambers 36 and 34 counter-balancing each other and having no effect on the operation of the relay.

While in actual operation the bleed valves 49 and 51 are never adjusted so that pressures within chambers 37, 36, and 34 are instantaneously equalized, such a condition has been discussed for the reason that ultimately it is the condition which will exist regardless of the adjustment of the bleed valves 49 and 51. That is so say, regardless of the adjustment of the bleed valves 49 and 51, and regardless of the temporary effect which may be secured by such adjustment, ultimately whatever effect the relay 32 may have on the loading pressure transmitted to the servomotor 43 is removed, so that only that produced by the relay 17 remains. Thus, as now will be explained, the relay 32 acts merely to produce a temporary effect upon the loading pressure in a direction and amount to materially increase the speed with which the temperature within the tank 1 is restored to the desired value after departure therefrom, and also the exactness with which the temperature within the tank 1 is maintained at the desired value.

Assume now that the bleed valve 49 is left substantially open, whereas the bleed valve 51 is practically closed so that only a slow seepage of pressure fluid occurs from the chamber 36 to the chamber 34. Under this adjustment upon a change in pressure within chamber 33, the member 44 will be displaced from the neutral position, thereby opening the supply valve 39 or the exhaust valve 40. As pressures within chambers 37 and 36 will equalize substantially instantaneously, it is evident that the pressure within the chamber 37 will either go to a maximum or to a minimum. This pressure being transmitted to the diaphragm servo-motor 43 will likewise cause the valve 3 to move to a substantially open or closed position. Thereafter as pressure fluid gradually seeps between the chambers 34 and 36, the pressure within chamber 36 will be gradually counterbalanced, so that when the pressure within the chamber 34 is equal to that within chamber 36 the change in pressure within chamber 37 will be equal to the original change occurring in chamber 33. Thus ultimately the entire effect of the relay 32 will be removed, so that merely the change in pressure produced by the relay 17 will be effective upon the diaphragm motor 43.

Usually it is preferable, upon a change in loading pressure occurring within the chamber 33, that the pressure within the chamber 37 does not go to a minimum or maximum, but that it changes an amount proportional to the change in pressure within the chamber 33, although of greatly amplified amount. This I accomplish by adjusting the bleed valve 49 so that the pressures within chambers 36 and 37 are not instantaneously equalized, but that an appreciable difference exists between the pressures. Under such an adjustment the pressure within the chamber 36 may be said to regeneratively amplify that within the chamber 37, for the reason that as the pressure within chamber 36 changes it will cause a further change in pressure within the chamber 37, which latter change will cause a further change in pressure within the chamber 36, which operation will continue until a minimum or maximum pressure is reached, or the effectiveness of the pressure within the chamber 36 is partially or wholly counterbalanced by the pressure within chamber 34. This latter action is obtained by the seepage of pressure fluid between chambers 34 and 36, so that as hereinbefore explained when the pressure within chamber 34 is equal to that within chamber 36 the change in pressure within chamber 37 will equal that within the chamber 33.

It is evident that by proper adjustment of the bleed valves 49 and 51 any desired temporary change in pressure within the chamber 37 may be obtained for a given change in pressure within the chamber 33, and that likewise such temporary change may be maintained for any desired increment of time. The particular adjustments of the bleed valves 49 and 51 producing best results must of course be determined by actual experiment and depends upon the characteristics of the system being controlled.

To provide further flexibility of the control system the chamber 34 may be connected to the volume chamber 52 as shown so that the length of time required for the pressures within chambers 34 and 36 to equalize may be increased, and likewise varied by varying the volume of the chamber 52.

In Fig. 3 I show a modified form of the relay 32 wherein the pipe 48 in the arrangement shown in Fig. 1 connects the chamber 36 with the chamber 37, whereas the pipe 50 connects the chambers 37 and 34. The operation of the relay shown in Fig. 3 is the same as that shown in Fig. 1. The modified arrangement of the pipes 48 and 50 in some instances facilitating the ease with which the relay may be adjusted to obtain optimum results. Thus it is evident that in the arrangement shown in Fig. 1 the rate at which pressure fluid will seep between chambers 34 and 36 is necessarily dependent upon the rate at which pressure fluid seeps between the chambers 36 and 37. In the arrangement shown in Fig. 3 the seepage of pressure fluid between chambers 34 and 37 is independent of the seepage of pressure fluid between chambers 36 and 37. In general, however, I have found that either arrangement is satisfactory, for the valve 51 is usually adjusted for a much slower rate of bleed than is the valve 49, and accordingly the arrangement of the relay 32 shown in Fig. 1 will give substantially same type of operation as the relay shown in Fig. 3.

In operation, assuming an increase in temperature within the tank 1 the pilot valve 8 will act to produce a change in loading pressure of proportionate amount. The relay 17 will operate to establish in the chamber 22 a change in pressure corresponding to the change in loading pressure established by the pilot 8, and thereafter a slow continuing change so long as the temperature within the tank 1 remains at a value other than that desired. The pressure established in the chamber 22 is transmitted to chamber 33 of relay 32. The change in pressure within chamber 33 causes an immediate change in pressure within the chamber 37 and by virtue of the aiding action of the relatively fast bleed between the chamber 37 and chamber 36 the practical effect of the relay 32 is to produce a change in pressure within the chamber 37 of much greater magnitude than the change in pressure within the chamber 33. The change in pressure within chamber 37 will likewise continue to increase due to the regenerative effect of the pressure within the chamber 36. Gradually pressure fluid will seep through bleed valve 51 from the chamber 36 to the chamber 34. The increase in pressure within chamber 34 will neutralize the effect of the pressure within the chamber 36 so that gradually the pressure within the chamber 37 will be restored toward its original value; and ultimately the change in pressure within chamber 37 (and line 41) will be the same as that which occurred in the chamber 33. In other words, the pressure within chamber 34 may be said to degenerate the regeneratively amplified change in pressure initially occurring within the chamber 37 until the fluid pressure control effect in line 41 is restored to its unamplified changed value.

Changes in pressure within the chamber 37 are transmitted to the diaphragm servo-motor 43 of the valve 3. It will be noted that in the example just described, immediately upon the increase in temperature within the tank 1, the valve 3 will be positioned in a closing direction a relatively large amount, and then gradually will be moved toward an open position, but will not be restored to the position it originally had, due to the action of the relay 17. It will further be noted that the amount of the original movement of the valve 3 in a closing direction will depend in part upon the rapidity with which the temperature within the tank 1 is changing. That is to say, the more rapid is the increase in temperature the greater will be the movement of the valve 3 in a closing direction. Thus notwithstanding that the temperature within the tank 1 has not changed a material amount from the desired value, if the temperature is actually changing at a rapid rate the valve 3 will be positioned a relatively larger amount in a closing direction temporarily and then gradually as the temperature ceases to change the valve 3 will be positioned in an opening direction an amount depending upon the amount which the temperature has departed from the desired value.

While I have illustrated and described a preferred embodiment of my invention, it will be apparent that various changes and modifications may be made without departing from its spirit and scope.

This application is a division of my copending parent application Serial No. 402,386 filed July 14, 1941, now Patent 2,441,405.

What I claim as new, and desired to secure by Letters Patent of the United States, is:

1. A pneumatic relay including, a first and second chamber separated by a pressure sensitive wall and a third and fourth chamber separated by a second pressure sensitive wall, a movable member connecting said pressure sensitive walls, supply and exhaust valve means in said fourth chamber operated by said movable member, a first restricted pressure transmitting connection between the second and fourth chambers, and a second restricted pressure transmitting connection between the third and fourth chambers.

2. A pneumatic pressure relay including, a first and second chamber separated by a pressure sensitive wall and a third and fourth chamber separated by a second pressure sensitive wall, a movable member connecting said pressure sensitive walls, supply and exhaust valve means in said fourth chamber operated by said movable member, a first pressure transmitting connection between the second and fourth chambers, a second pressure transmitting connection between the third and fourth chambers, and means restricting at least one of the pressure transmitting connections.

3. A pneumatic relay including, a first and second chamber separated by a pressure sensitive wall and a third and fourth chamber separated by a second pressure sensitive wall, a movable member connecting said pressure sensitive walls, supply and exhaust valve means in said fourth chamber operated by said movable member, a first pressure transmitting connection between the second and fourth chambers, a second pressure transmitting connection between the third and fourth chambers, and an adjustable restriction in at least one of the pressure transmitting connections.

4. A pneumatic relay including, a first and second chamber separated by a pressure sensitive wall and a third and fourth chamber separated by a second pressure sensitive wall, a movable member connecting said pressure sensitive walls, supply and exhaust valve means in said fourth chamber operated by said movable member, a first pressure transmitting connection between the second and fourth chambers with an adjustable restriction, and a second pressure transmitting connection between the third and fourth chambers with an adjustable restriction.

EDWARD W. FITCH.

REFERENCES CITED

The following references are of record in the file of this patent:

UNITED STATES PATENTS

| Number | Name | Date |
|---|---|---|
| 2,098,914 | Gorrie | Nov. 9, 1937 |
| 2,117,800 | Harrison | May 17, 1938 |
| 2,360,889 | Philbrick | Oct. 24, 1944 |
| 2,476,104 | Mason | July 12, 1949 |